(No Model.)
T. A. WATSON.
TELEPHONE CIRCUIT AND SWITCH.
No. 248,815. Patented Oct. 25, 1881.
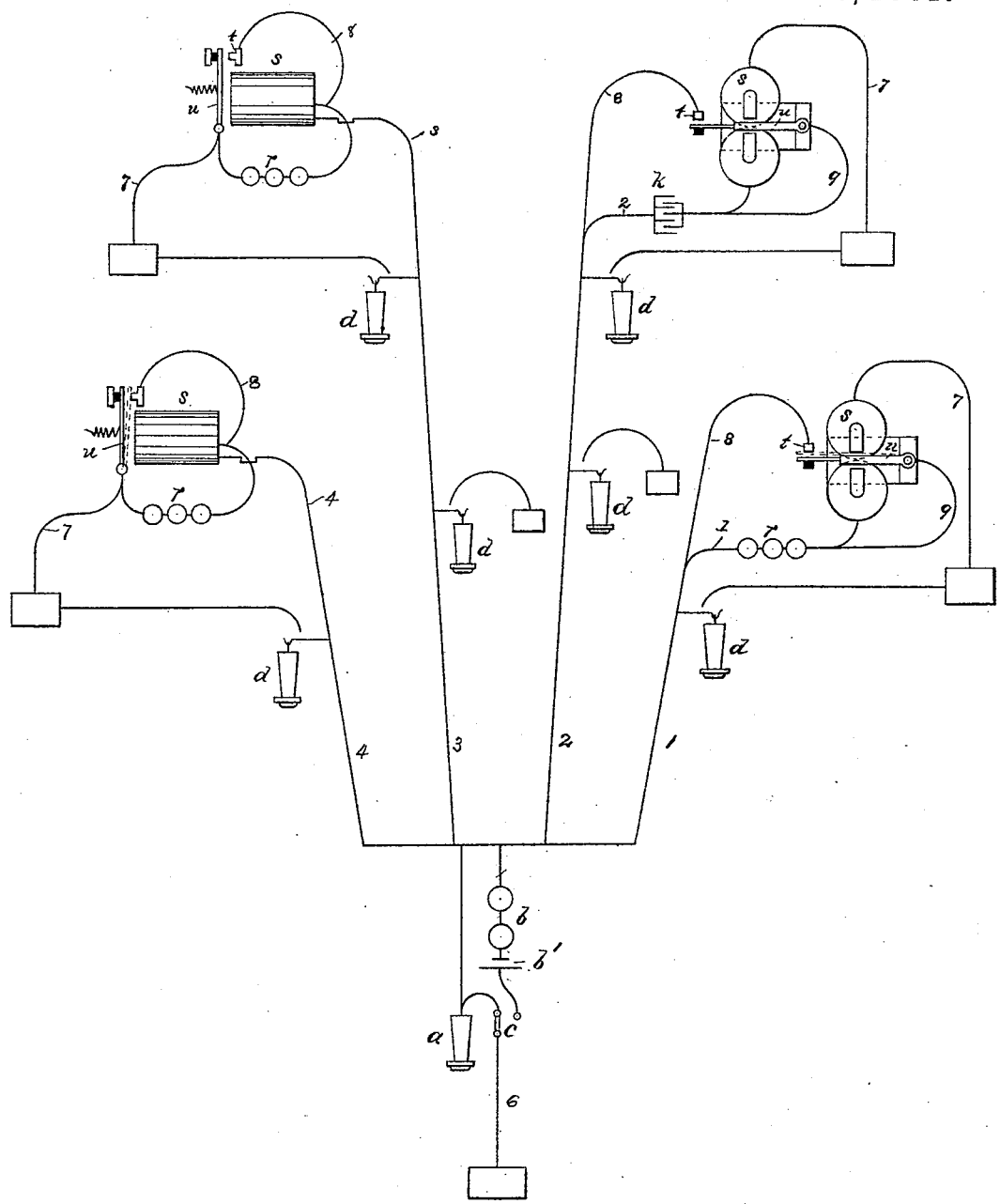
Witnesses.
Jos. P. Livermore
L. F. Connor.
Inventor—
Thomas A. Watson
by Crosby & Gregory
attys.

UNITED STATES PATENT OFFICE.

THOMAS A. WATSON, OF EVERETT, ASSIGNOR TO THE AMERICAN BELL TELEPHONE COMPANY, OF BOSTON, MASSACHUSETTS.

TELEPHONE CIRCUIT AND SWITCH.

SPECIFICATION forming part of Letters Patent No. 248,815, dated October 25, 1881.

Application filed April 29, 1880. (No model.)

*To all whom it may concern:*

Be it known that I, THOMAS A. WATSON, of Everett, county of Middlesex, State of Massachusetts, have invented an Improvement in Telephone-Exchange Systems and Circuits and Instruments therefor, of which the following description, in connection with the accompanying drawings, is a specification.

The invention has for its object to facilitate the work of receiving and answering calls and connecting the different subscribers' lines, and relates to a system in which the said lines are normally connected at the central office of the exchange with a common branch or union circuit containing a telephone or other suitable form of instrument.

Heretofore such a system has been devised in which each line has been provided with a high resistance formed by the coils of an electro-magnet and with a switch formed by the armature of said magnet, for short-circuiting the coils of the latter. The high resistance is employed to prevent the current from being divided, and the switch, by cutting out the resistance, enables the signal to be given.

In the present invention the system is improved, first, by making the resistance separate from the switch-magnet and retaining the coils of the latter always in circuit, so that after the switch has been operated by a strong current the signaling may afterward be done by ordinary currents, leaving the battery for supplying the strong current at liberty; secondly, by having two branches, one containing a telephone and the other a battery and signaling-instrument, connected with the lines and providing a switch for connecting either to ground; and, thirdly, by substituting carbon or equivalent resistance free from self-induction for coils of wire, so that no line or system of lines will be liable to disturbance by the charge or discharge of resistance.

The drawing shows a series of circuits all uniting and passing through a single central instrument and provided with electric switches or relays to close a short or direct circuit to the ground, in accordance with my invention. Four circuits, 1 2 3 4, are shown, uniting in a common circuit, which may pass through a single central telephone, $a$, of usual construction, or through the electro-magnet of an indicating-instrument or annunciator, $b$, and battery $b'$, according to the position of the switch $c$, and thence through the wire 6 to the ground. The said circuits have any desired number of subscribers' stations, (shown at the telephones $d$,) the circuit passing directly through the said stations and usual apparatus therein, until at the terminal station they pass through the resistance-coils shown at $r$ in circuits 1, 3, and 4, also passing through the magnets $s$ of the relays or electric switches, and then by wires 7 8 to the ground. The circuit 2 passes to one series of plates of the condenser $k$, the other series, being connected by wire 7, passing through the magnet $s$ of the switch to the ground. The switches on circuits 3 4 are shown as common relays, lightly adjusted.

A branch circuit, which should include the coils of the relay-magnet $s$, but pass around the resistance $r$, (or open point, if the circuit be open,) is shown on circuits 3 4 as a wire, 8, joining the circuit-wire 3 after it has passed through the magnet $s$ and passing to the front stop, $t$, of the relay, the armature $u$ whereof is connected to wire 7 beyond the resistance $r$, and by said wire to ground.

On circuits 1 2 polarized relays are used and the branch circuit is connected differently, the branch wire 8 joining the main-circuit wires before they reach the resistance $r$ or open point $k$, and a wire, 9, passing from the armature $u$ to a point on the main circuit between the resistance or open point and the magnet $s$ whence the circuit passes through the said magnet and wire 7 to the ground.

When a subscriber wishes to communicate with another he merely closes the circuit at his station to the ground, the said operation being herein shown as performed by raising the telephone from the automatic switch-hook, thus immediately throwing his telephone in circuit with the one $a$ at the central office, or closing a short circuit through the indicator $b$ and its battery $b'$ according to the position of the switch $c$. In either case the resistance $r$ in the branch circuits in the normal condition of the switches, as shown in full lines, prevents the currents from being diverted therethrough, thus confining them to the circuit thus closed through the central instrument.

When the telephone is cut out and the signaling-instrument is in circuit, which will be the case when calls from subscribers succeed each other very rapidly, the signaling-instrument will be operated automatically by the grounding of the line at the subscriber's station.

When it is desired to call a subscriber on one of the circuits a sufficient current is passed through the said circuit to throw (in acting on the relay-magnet through the resistance $r$) the armature $u$ against its front stop, as shown in dotted lines in circuits 1 and 4, thus closing a short circuit through the said magnet and causing its armature to be strongly attracted, after which the signal may be given when common relays are used by any apparatus which does not require the circuit to be actually broken—as, for instance, by magneto-electric currents, or by instruments operated by throwing in resistance or varying the strength of currents without wholly breaking the circuit, such an apparatus being shown in an application of George L. Anders, filed April 19, 1880.

When a polarized relay is used, as shown in circuits 1 2, it may be so adjusted that after the said armature is once thrown against the stop $t$ it will remain so until the current is reversed, so that this variety of switch is preferably used in connection with signal apparatus operated by breaking the circuit.

If desired, the armatures or cores of the common relays shown on circuits 3 4 may be made of slightly hardened steel, or slightly polarized, so that they will remain attracted by residual magnetism while a signal is being given, even by breaking the circuit, the armature being thrown back in this case by a weak reversed current. In any case after the signal has been given the circuit should be restored to its original or normal condition by breaking the circuit if a common relay is used, or by sending a reversed current if a polarized relay is used, the armature and contact-points being properly adjusted in the latter case to cause the armature to remain against whichever of its stops it happens to be in contact with, as long as the electro-magnet thereof is in neutral condition.

It is obvious that other varieties of switches may be employed adapted to operate, if desired, at the end of an open circuit or by currents of high tension adapted to pass over an open point, the said switches being adapted to close the said circuit and thereafter to be controlled by the said closed circuit.

It may be desirable to have a larger number of indicating-instruments, $v$, than of central telephones, $a$, connecting a smaller number of circuits in a group passing through a single indicator, $b$, than is used with a single telephone, $a$.

In order to avoid the disturbing effect upon the line or system of lines the resistances $r$ are made of carbon or other material free from self-induction, such as a suitable liquid. As the resistances would ordinarily be very large and need not be nicely adjusted, such material may very well be employed. An open point (not a condenser) also gives a resistance which is free from self-induction.

The connection of the subscribers' lines with each other is effected in any ordinary or suitable way, as by one of the common forms of switch-board.

Having now fully described my said invention and the manner of carrying the same into effect, I would observe, in conclusion, that the use of open circuits and the adaptation of signal apparatus to such circuit, and also the use of polarized relays for cutting out an open point or other high resistance are not specifically claimed herein, claims thereto being made in a separate application of even date herewith, (issued November 9, 1880, as Patent No. 234,154;) but

What I do claim is—

1. In a line-circuit, the combination, with a high resistance at the end of the line and a separate electro-magnetic switch, of connections and contacts arranged, as explained, so that the said resistance is shunted while the switch-magnet remains always in circuit, substantially as described.

2. In a telephone exchange system, a series of subscribers' lines branching out from and normally connected with a central-office instrument, and provided each at its outer end with a high resistance, in combination with a series of electro-magnet switches located in said lines, but separate from the resistances and arranged when operated to cut out the resistance of their respective lines, their own magnets remaining always in circuit, substantially as described.

3. In a telephonic-circuit, an electric switch comprising an electro-magnet and armature, and located at the end of said circuit, said switch being adapted to be operated from a distant point on the line by a single vibration of said armature to alter the electrical resistance of the line or to restore it, substantially as described.

4. The combination, with a series of subscribers' lines, of two branches both normally connected with and common to the said lines, a telephone in one branch and a signaling instrument and battery in the other, a ground wire and a switch for connecting either of said branches to ground, substantially as described.

5. In a telephone-exchange system, two or more subscribers' wires, normally connected at the central station with the same receiving-telephone, in combination with carbon or equivalent resistance free from self-induction placed in the subscriber's wire and acting to prevent the diversion of the telephonic currents from the listening-telephone, as set forth.

6. In a telephonic-exchange system, the combination of two or more wires extending from a central station, a listening-telephone at said central station common to the several wires, and telephonic transmitting apparatus and signal-bells on each wire, provided with carbon or equivalent resistance, substantially as described.

7. In a telephone-exchange system, two or more independent lines, one for each subscriber, extending from a central office, and at each subscriber's station two branch lines to earth, one containing a telephone and the other a signal-bell and carbon or equivalent resistance, in combination with a switch for connecting at pleasure either branch with the main line, substantially as described.

In testimony whereof I have signed my name to this specification in presence of two subscribing witnesses.

THOMAS A. WATSON.

Witnesses:
   JOS. P. LIVERMORE,
   N. E. C. WHITNEY.